Aug. 14, 1928.
R. TARSHIS
1,681,067
HELICOPTER
Filed July 7, 1927
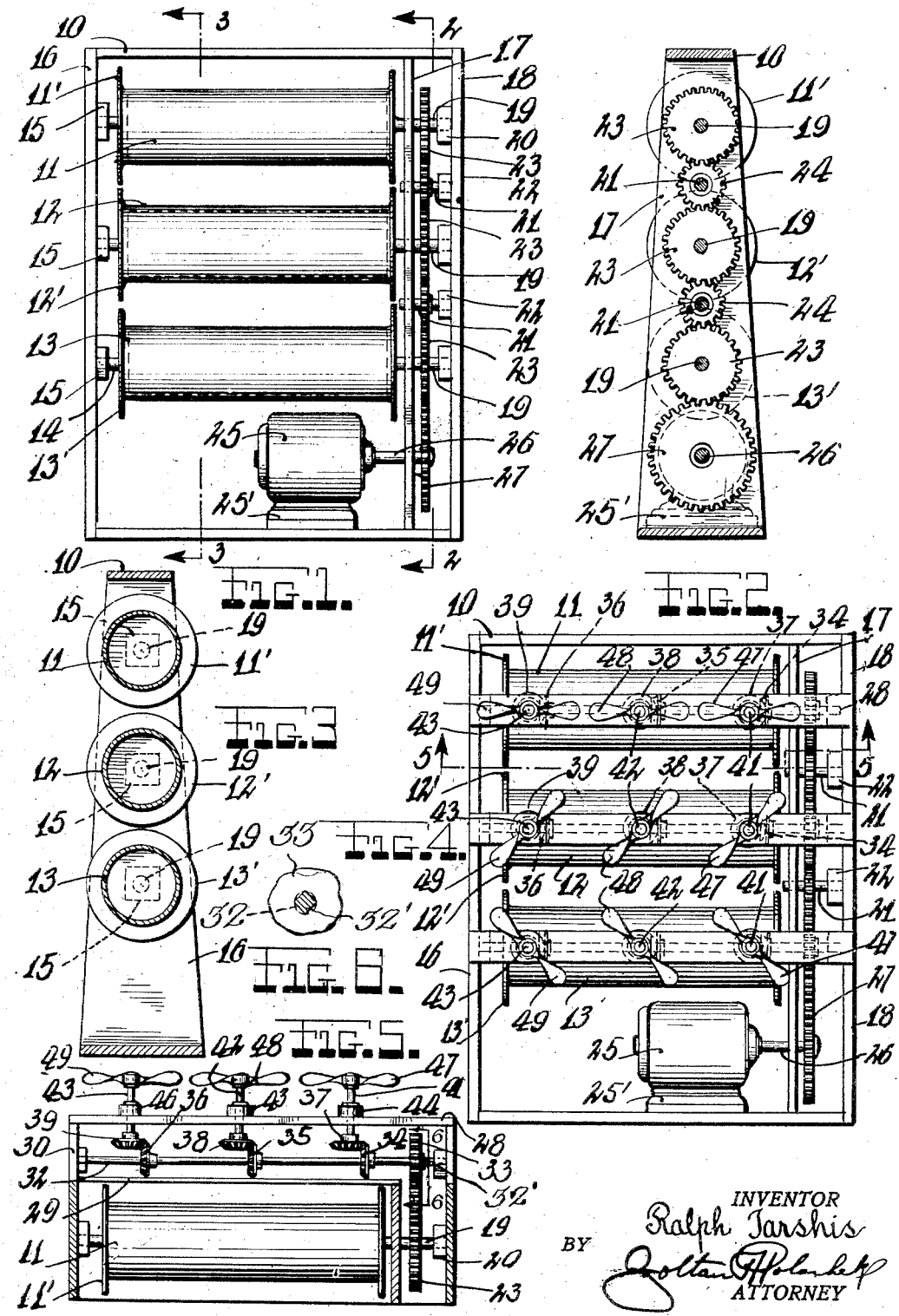
INVENTOR
Ralph Tarshis
BY
Zoltan Holenkoff
ATTORNEY Patented Aug. 14, 1928.

1,681,067

UNITED STATES PATENT OFFICE.

RALPH TARSHIS, OF BROOKLYN, NEW YORK.

HELICOPTER.

Application filed July 7, 1927. Serial No. 203,991.

This invention relates to improvements in helicopters and has for its object the provision of a simplified device for resisting the powers of gravity.

A further object of my invention is the provision of a device of this character which may be directionally controlled to resist wind thus rendering the device capable of making a vertical ascent.

In the drawings:

Fig. 1 is a plan view of my invention in the position in which it is adapted to ascend.

Fig. 2 is a longitudinal sectional view taken on line 2—2 of Fig. 1.

Fig. 3 is a longitudinal sectional view taken on line 3—3 of Fig. 1.

Fig. 4 is a plan view of a further development of my invention.

Fig. 5 is a transverse sectional view taken on the line 5—5 of Fig. 4.

Fig. 6 is a fragmentary enlarged sectional view taken on the line 6—6 of Fig. 5.

Referring particularly to Fig. 1 of the drawing, the numeral 10 designates a frame of rectangular shape in which three hollow drums 11, 12 and 13 are rotatively mounted in horizontal alignment. Flanges 11', 12' and 13' tend to keep the air away from the vacuum created of drums 11, 12 and 13, respectively, above the periphery of the said rotary discs. Stud shafts 14 are mounted rigidly on the left end of the drums 11, 12 and 13 and are rotatively journaled in bearing members 15, mounted in the left side 16 of the frame 10. A vertically extending partition 17 is disposed in the frame 10 in spaced relation to the right side 18 of the said frame. Shafts 19 are rigidly attached to the right ends of the drums 11, 12 and 13, and are disposed through apertures in the partition 17 and journaled at their outer extremities in bearings 20 on the side 18 of the frame.

Two short shafts 21 are journaled at their outer ends in bearings 22 on the side 18 of the frame 10 and are journaled at their other end portions in apertures in the partition 17. The shafts 21 are equally spaced between the shafts 19 of the adjacent rollers. Gears 23 are rigidly mounted on the shafts 19 of the drums 11, 12 and 13 and are meshed with idler gears 24 rigidly mounted on the shafts 21. The gears 24 are disposed between each of the gears 23 of the drums for the purpose of causing the rotation of all the drums to be in one and the same direction.

A motor, either gas or electric, is mounted on the base 25' of the frame 10 and is provided with a shaft 26 having a pinion 27 thereon in mesh with the lowermost gear 23.

In the modified form of my invention shown in Figs. 4 and 5 the frame 10 is provided with three pairs of laterally disposed cleats 28 and 29, both cleats being positioned in superimposed relation adjacent the drums and spaced apart by blocks 30 and 31 mounted on the sides of the frame 10. The cleat 29 extends from one side of the frame 10 to the partition 17 and the cleats 28 extends from side to side of the frame. A shaft 32 is journaled at its extremities in the blocks 30 and 31 and extends laterally across the frame. The shaft 32 is provided with a square section 32' upon which is slidably mounted a gear 33 meshed with the gear 23 of the drum 11. Bevel gears 34, 35 and 36 are mounted on the shaft 32 and are meshed with bevel gears 37, 38 and 39, respectively, mounted on shafts 41, 42 and 43, respectively. The shafts 41, 42 and 43 are journaled in bearing members 44, 45 and 46, mounted on the outer cleat 48 and the outer extremities of the shafts 41, 42 and 43 are provided with propeller members 47, 48 and 49, respectively.

It should be understood that the propellers may be rotated when the drums are rotated by an operative driving connection between the gear 23 and the gear 33, the latter gear being slidably mounted on the square section 32' of the shaft 32 so as to be able to be moved into and out of mesh with the gear 23 as desired. It should also be understood that each drum is provided with a set of three propellers mounted and operatively connected to the driving mechanism as described above.

In the operation of my invention the propellers or fans 47, 48 and 49 when rotated produce a current of air which is directed against the drums 11, 12 and 13, substantially at right angles thereto. If there is a natural current of air in motion, then the device is so positioned so as to have the natural current of air combined with the artificial current of air produced by the propeller. When there is a sufficiently strong natural current of air the artificial current is not necessary and if desired the propellers may be rendered inoperative by disengaging the gears 23 and 33 as above set forth. The hollow cylinders or drums rotate at a very high speed preferably 200 R. P. M. and the rotation of the propellers may be predetermined by the selection of suitable gears. The resultant of the air forces set up around the drums and the perpendicular force developed by the propellers is an upward force which tends to urge the device upwardly against the force of gravity.

Having thus fully disclosed an embodiment of my invention, what is desired to be secured by Letters Patent of the United States is:

1. A helicopter of the class described comprising a frame, spaced hollow cylinders rotatively mounted in said frame, a motor mounted in said frame, driving mechanism mounted in said frame and operatively connected with said motor and said hollow cylinders adapted to cause rotation of the latter in a single direction for lifting said frame and the mechanism mounted therein against the force of gravity, a shaft rotatively mounted in said frame, the inner end of said shaft having a substantially square cross-section, a bevel gear slidably mounted on the inner end of said shaft, a second bevel gear attached to the said shaft, a second shaft disposed substantially at right angles to said first mentioned shaft and rotatively mounted in said frame, a propeller on the outer end of said second mentioned shaft, and a bevel gear on the inner end of said second mentioned shaft, meshing with said second bevel gear, the slidably mounted bevel gear being engageable with the said driving mechanism when in a predetermined position for causing rotation of said propeller at suitable velocity to create artificial currents of wind, in the absence of natural wind of suitable velocity.

2. A helicopter of the class described comprising a substantially rectangular frame, spaced apart hollow cylinders rotatively mounted in said frame with their longitudinal axis disposed laterally thereof in alignment in a substantially horizontal plane, means for rotating said hollow cylinders to cause said frame and the contents thereof to ascend, propeller shafts disposed at right angles to the plane of the axis of said cylinders rotatively mounted in said frame and extending in advance thereof, and propellers attached to the outer end of said shafts which are rotated and adapted to create wind current of suitable velocity at right angle to sides of each rotary drum for causing said helicopter to ascend vertically against force of gravity.

3. A device of the class described comprising a frame, spaced apart cylinders rotatively mounted in said frame, driving mechanism operatively connected with said cylinders for rotating the same, and means for creating a forced current of air upon said cylinders to combine with the currents of air created by rotation of the latter for producing an upward resultant air force for lifting said frame and the mechanism therein against the force of gravity.

4. A device of the class described comprising a frame, a plurality of spaced apart cylinders rotatively mounted in said frame and a plurality of propellers adapted to produce a forced draft of air substantially at right angles to the longitudinal axis of said cylinders.

In testimony whereof I have affixed my signature.

RALPH TARSHIS.